May 2, 1933.    F. B. CARRUTHERS    1,906,739
PORTABLE GLASS CUTTING AND DRESSING MACHINE
Filed March 19, 1928    2 Sheets-Sheet 2
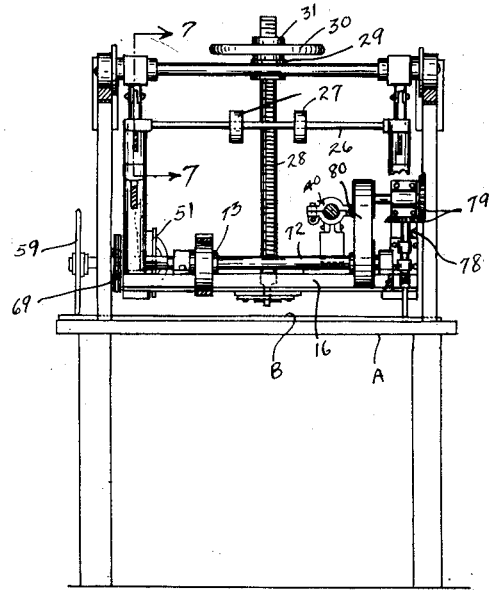
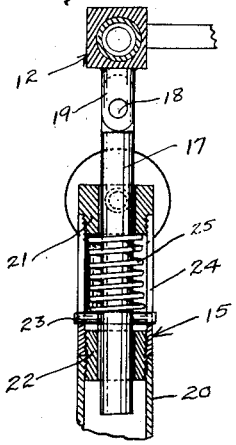
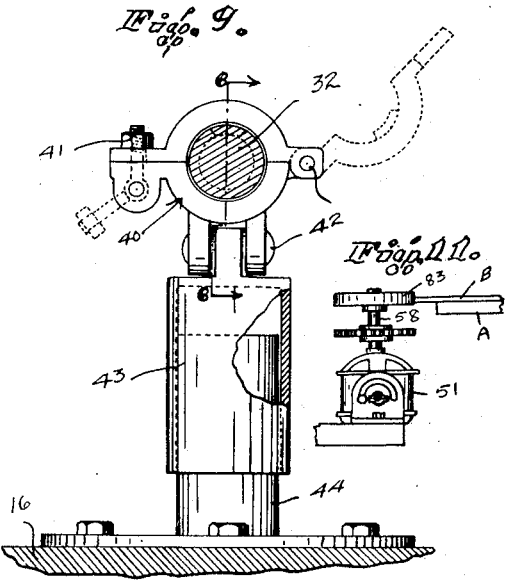
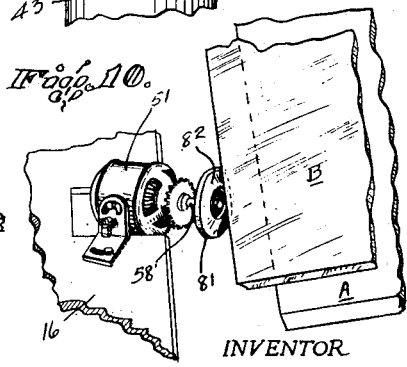
INVENTOR
F. B. CARRUTHERS
BY
ATTORNEY.

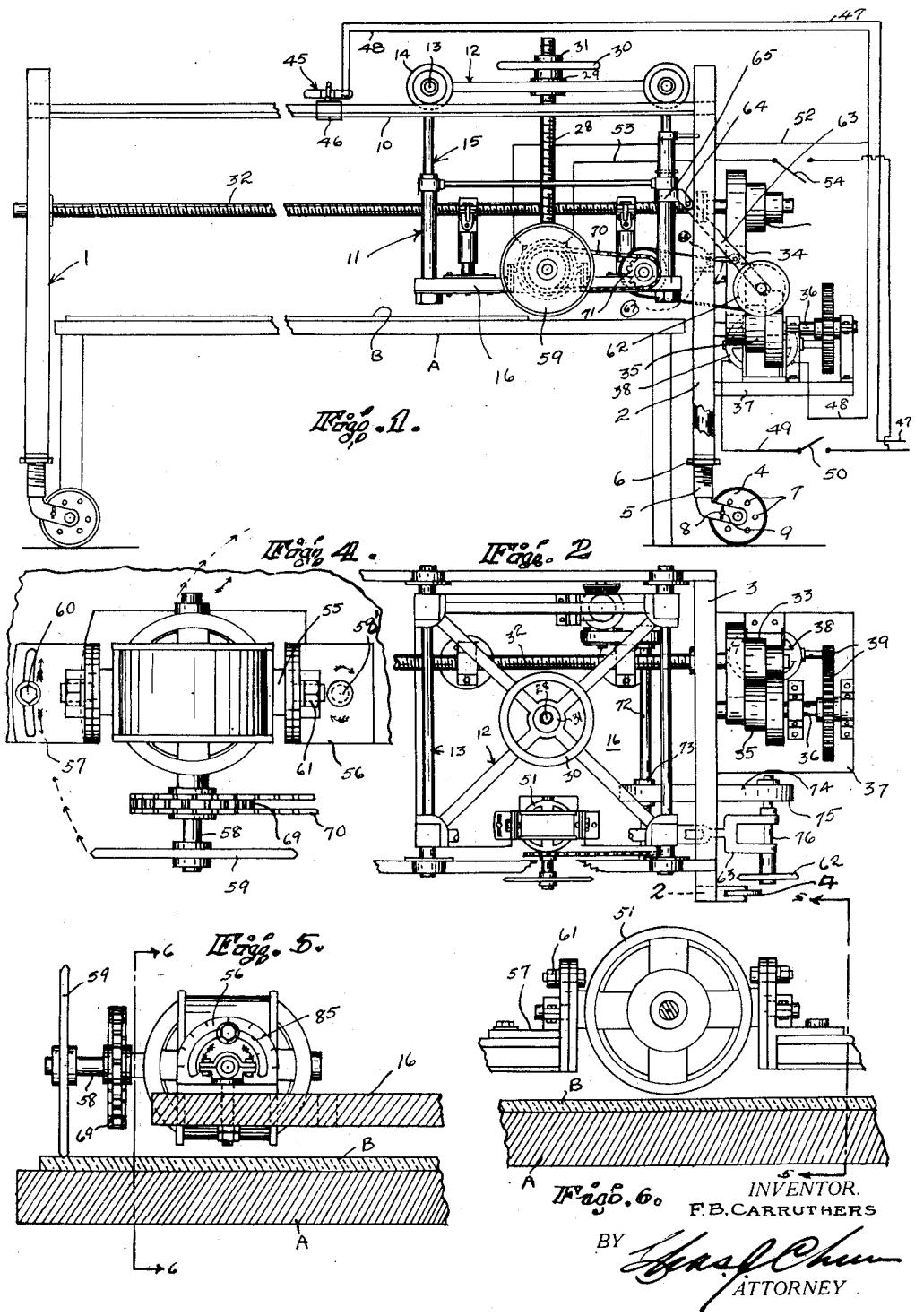

Patented May 2, 1933

1,906,739

UNITED STATES PATENT OFFICE

FREDERICK B. CARRUTHERS, OF SAN FRANCISCO, CALIFORNIA, ASSIGNOR OF ONE-HALF TO WILLIAM H. LARGE, OF SAN FRANCISCO, CALIFORNIA

PORTABLE GLASS CUTTING AND DRESSING MACHINE

Application filed March 19, 1928. Serial No. 262,696.

This invention resides in the provision of a simple and inexpensive portable glass treating machine, which as a single unit, may be efficaciously operated to mitre cut large or small glass plates with equal efficacy; to grind and polish the edges of glass plates; to cut and polish finger pulls; to mitre plates for store fronts, show cases, etc.; to drill holes of various sizes; to grind notches in the edges of plates, and to perform other work of treating and dressing said plates.

The machine of this invention is particularly advantageous for the purposes above named in view of its consisting of a portable skeleton frame having a power driven carriage thereon, supporting various power operated glass cutting and glass treating tools, the said carriage and frame being readily adjustable whereby with the combined advantage of portability, the machine may be readily and easily set up in position of operation with relation to the glass plate. By this arrangement the machine is moved to the work, which may be held stationarily on a suitable table or like support, and it is unnecessary to move the work relative to the machine. This is a decided advantage in the treatment of glass plates and the like, in that it not only provides for a saving in time and labor and eliminates the risk of breakage which occurs in the handling and moving of the glass plates, but also permits of cutting, polishing and otherwise dressing of the glass plates at any point throughout the area of large or small plates without moving or adjusting the said plates.

Another advantage of the invention is the provision in the single portable machine of this invention of adapting the machine for performing various kinds of work on glass plates in a simple and efficacious manner, it only being necessary to make simple adjustment of the mechanism in order to adapt it for performing any one of the various operations on glass plates such as described.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a side elevation of the machine of my invention.

Fig. 2 represents a fragmentary top plan view of the machine of my invention.

Fig. 3 represents a sectional view taken on the plane of line 3—3 of Fig. 2.

Fig. 4 represents a fragmentary top plan view of one of the elements of the machine.

Fig. 5 represents a sectional view taken on the plane of line 5—5 of Fig. 6.

Fig. 6 represents a sectional view taken on the plane of line 6—6 of Fig. 5.

Fig. 7 represents an enlarged sectional view taken on the plane of line 7—7 of Fig. 3.

Fig. 8 represents a sectional view taken on the plane of line 8—8 of Fig. 9.

Fig. 9 represents a sectional view of a part of the mechanism, being shown particularly in side elevation.

Fig. 10 represents a fragmentary perspective view of one of the units of the machine as employed for beveling the edges of glass plates.

Fig. 11 represents a side elevation of one of the elements of the machine showing it in the position in which it is adjusted to polish the edges of glass plates.

The present embodiment of the invention as illustrated in the accompanying drawings comprises a portable frame generally designated 1, and made up of a plurality of upright telescopic, extensible standards 2, the upper portions of which are joined by cross members 3. Each standard carries casters or wheels 4 at its lower end. The lower section 5 of each standard 2 is threaded and has a nut 6 turned thereon, which nut is adapted to engage the lower end of the upper section to limit the extension of the lower section into the upper section. By adjusting these nuts the length of the standards may be increased or decreased as desired.

The casters are provided with openings 7 adapted to register with openings 8 in the mountings for the casters, whereby pins 9 n y be inserted through the registering openings to lock the casters against turning and to thereby render the frame a stable and stationary support for the machine, as will be later more fully described.

Reciprocally mounted upon tracks 10 which extend lengthwise of the upper part of the frame 1, is a carriage generally designated 11. This carriage is adapted to be moved back and forth in the various operations of the machine and is so situated that the frame with the carriage thereon may be readily and easily wheeled or rolled into position over or adjacent to a table or work bench designated A, shown in Fig. 1, on which table or work bench the glass plate B to be treated, is supported. The carriage 11 comprises a suitable skeleton frame 12, including front and rear axles 13 on which are mounted flanged rollers 14, said rollers riding on the tracks 10. Depending from the frame 12 at the four corners thereof, are four telescopic, resilient hangers 15 which support a platform 16, on which latter is mounted the mechanism for treating the glass. One of the hangers 15 is illustrated in detail in Fig. 7 and comprises an upper rod 17 pivoted as at 18 to a downward projection 19, from the frame 12. A tubular member 20 telescopes the member 17 and the platform 16 is fastened to said tubular member. Plugs 21 and 22 are mounted in said tubular member in spaced relation to one another and act as bearings for said rod 17. The rod 17 is provided with a pin 23 extending transversely therethrough and slidably engaging in slots 24 formed on opposite sides of the tubular member. A helical expansion spring 25 is mounted on the rod 17 and at its ends abuts the opposed ends of the plugs 21 and 22. By this arrangement the platform 16 is resiliently supported by the carriage and is capable of yielding upwardly in order that the glass engaging tools of the various mechanisms which are carried by the platform 16 will yield in the operation of the machine as will be later more fully described. A bar 26 extends across certain opposed tubular members 20 and is adapted to support removable weight members 27, the purpose of which is to hold the plate 26 downward against the tension of the springs 25. These weight members may be increased or decreased dependent upon the amount of spring tension required for certain glass treating operations.

The mechanism supporting platform 16 may be vertically adjusted by means of an upright screw member 27 fixed to the central portion of the platform 16 and extending upward through a smooth bearing 29 in the frame 12. An adjusting wheel 30 having a screw threaded hub 31 is turned on the upper end of the screw and abuts the bearing 29.

By turning this wheel the platform 16 may be slightly raised and lowered to suit the particular operation of the machine, as will be later more fully described. The members 17 are pivoted as at 18 to compensate for binding tendencies in the telescopic hangers.

The carriage is power driven by means of a screw threaded shaft 32, which shaft is suitably journaled in the main frame 1 and carries a plurality of pulleys 33. A belt 34 may be placed on any one of the pulleys 33 and around any one of a similar group of pulleys 35 mounted on a shaft 36 suitably journaled on a motor supporting platform 37 fixed to one end of the main frame 1. A motor 38 on said platform, through gears 39, rotates the shaft 36 and thereby through the pulleys 35, belt 34, pulleys 33, rotates the screw shaft 32. Hinged screw threaded sleeves 40 having latch members 41 to releasingly hold them in sleeve formation, are pivoted as at 41 upon the upper ends of the tubular members 43 which telescope upright studs 44 fixed to the platform 16. These two sleeves provide for operatively connecting and disconnecting the carriage with the feed screw 32.

By means of the portable vertically adjustable frame 1 and the carriage 11 which is reciprocally mounted on the frame and adapted to be power driven in one direction, various cutting, polishing and other glass treating tools carried by and operated on said carriage, may be conveniently applied in the proper manner to the glass plates to be treated. The frame 1 may be wheeled into position so as to straddle the table A carrying the glass plate, and the frame and its associated parts readily adjusted so as to dispose the glass treating tools on the carriage in proper position for the particular glass treating operation to be performed.

By the use of the power driven reciprocal carriage, tools for mitre cutting, beveling, polishing, cutting and polishing finger pulls, drilling holes and for performing other kinds of work on glass and the like, may be supported on said carriage and readily set up in proper position for efficacious use.

To further simplify and improve the operation of the carriage, I employ an automatic switch of the tilting thermoid type, designated 45, which switch is mounted on a sleeve 46 slidable on one of the tracks 10. An electrical conductor 47 leads from one side of the source of electrical energy, not shown, to one of the contact points of this switch, and from the other contact point of this switch a conductor 48 leads to one side of the motor 38. From the other side of the motor 38, a conductor 49 leads to the other side of the source of electrical energy. In this way the switch 45 is arranged in series with the motor and by adjusting the switch on the track 10, the motor 38 will be cut off automatically after the carriage has been advanced a predetermined distance due to the engagement of said switch by one of the wheels 14 of the carriage and the tilting of the switch into open position. A manually operated switch 50 is mounted in the conductor 49 to provide for controlling of the motor circuit. A motor 51 is mounted on the platform 16 for operating the various glass treating tools such as will be later more fully described. A conductor 52 is connected with the conductor 48 and to one side of the motor 51. A similar conductor 53 is connected with the other side of the motor 51 at one end and at its other end is connected with a conductor 49 at a point between the switch 50 and the source of current. A switch 54 is mounted in the conductor 53. When the switches 50 and 54 are closed, both motor circuits will be controlled by the switch 45. By reason of the switches 50 and 54. either motor may be cut in or out of the circuit controlled by the switch 45.

The motor 51 on the platform 16 of the carriage 11 is mounted near one edge of the platform 16 on horizontal trunnions 55 journaled in brackets 56 and 57, whereby the shaft 58 of the motor may be tilted. The bracket 56 is pivoted as at 58′ on the platform 16 by a pin and slot fastening indicated at 60, thereby permitting turning of the motor and the mounting therefor, so that the shaft 58 may be swung in a horizontal plane as well as tilted up and down. These adjustments are required in order that certain tools of different glass treating operations may be employed. On the outer end of the shaft 58 a circular glass treating tool 59 is removably mounted. As shown in Figs. 1, 2 and 4, this tool comprises a mitre cutting wheel adapted for making mitre cuts in the glass plate. When adjusting this tool, the motor is maintained in the normal position with the shaft 58 horizontally disposed. Nuts 61 on the trunnions provide for holding the motor in the desired position, likewise, the pin of the pin and slot connection 60 may be in the nature of a screw so that it may be tightened to hold the bracket 57 in adjusted position.

A polishing wheel 62 is mounted on the lower end of an arm 63, the upper end of which is pivoted as at 64 to a bracket 65 fixed on one of the hangers 11. A pin 66 is pivoted on the supporting arm 63 and extends through an opening in a number 67 carried by the frame 1. An abutment member 68 mounted on said pin is adapted to abut the member 67 whereby the upward movement of the arm 63 will be limited. The polishing wheel 62 is disposed in line with the mitre cutting tool 59 and is adapted to follow behind said tool to polish the mitre cutting member by the tool, the weight of said wheel causing it to slightly yieldingly contact with the mitre cut in the glass plate, as the carriage is moved along in the mitre cutting operation. A sprocket wheel 69 is fixed to the shaft 58 and operates a sprocket chain 70 which is extended around a sprocket 71 fixed to a shaft 72 suitably journaled on the platform 16. The shaft 72 carries a pulley 73 which operates a belt 74, which latter is mounted upon the pulley 75 fixed upon a shaft 76 journaled in the supporting arm 63. The polishing wheel 62 is fixed to and operated by the shaft 76. It will thus be seen that the machine of this invention may be readily slid into position over the table containing the sheet of glass to be treated, for example, to be mitre cut. After the frame has been moved into the desired position relative to the work, and the wheels or casters 4 set so as to stabilize the portable frame, the carriage is adjusted to the desired position to dispose the mitre cutting wheel 59 in position to make a mitre cut in the glass plate. After this, the cutting sleeves 40 are clamped around the screw shaft 32 and the machine is ready for operation. The switch 45 is adjusted to the desired position on the track 10 to cause the carriage to stop at the desired point and the motors 38 and 51 are started. The carriage is then advanced by the feed screw 32 so that the motor driven mitre cutter 59 is brought against the glass pane B to make the mitre cut therein. As the carriage advances, the polishing wheel 32 being in line with the cutter 59, will engage in the mitre cut and polish the same. When the carriage has been moved the predetermined extent, one of the wheels 14 trips the switch 45 and opens the circuit for the motors thereby shutting off the operation of the machine. The carriage 11 is so constructed that the disk 59 will be applied with a yielding pressure against the glass, this being also true of the polishing wheel, the degree of yielding pressure being subject to variance by the employment of the weights 27. After the cutting operation, the latches 41 are loosened and the hinged sleeves 40 opened, thereby permitting the carriage to be moved by hand, back to the starting point for another cutting operation. In making the second cutting operation, the entire frame may be quickly and easily moved to dispose the cutter in the proper position for the next cut. It will thus be seen that it is manifestly easier to move the portable machine into the desired position than to move the table or glass plate.

A suitable drill member 78 as shown particularly in Fig. 3, is mounted on the platform 16 of the carriage and provides for drilling holes in glass or other plates. This is controlled through gears 79 and a belt and pulley drive means 80 driven by the shaft 72. By reason of the adjustments permitted the carriage and the portability of the entire machine, the drill may be readily set up in the proper position to bore holes as desired.

To bevel the edges of glass plates, the chain 70 is removed from the sprocket 79 and the motor is adjusted into position such as shown in Fig. 10, it being not only turned but also tilted, by reason of the adjustment permitted it on the trunnions 55 and the pivoted and sliding brackets 56 and 57. The mitre cutting wheel 59 is replaced by a beveling wheel 81 having a frusto-conical face 82. Instead of moving the frame 1 so that it straddles the table and glass plate for beveling purposes, this frame is adjusted so that it extends on one side of the table A. The frame is also adjustable vertically as well as the platform 16 of the carriage, to dispose said platform 16 below the plane of the table and glass plate B, the shaft 58 of the motor 51 extending upwardly and angularly towards the edge of the plate B so as to dispose the wheel 81 in the angular relation to said edge as indicated in Fig. 10. In this way the frusto-conical grinding face 82 is brought against the under side of the glass in engagement with the edge of the glass so that as the carriage is moved along said edge, the wheel is rotated and a bevel will be formed along the edge of the glass. After the beveling operation, a polishing tool may be applied in the same manner to polish the beveled edge.

For grinding and polishing the edges of a glass plate, the motor 51 is adjusted into position shown in Fig. 11, with the shaft 58 extending vertically. A polishing or grinding wheel 83 may then be brought against the edge of the glass indicated at B for straight grinding or polishing. Beveling operations may also be carried out in this manner. To determine the proper position of adjustment of the motor, an angle indicator designated 84 may be provided on the bracket 56.

The mitre cutting wheel 59, or another tool to be disposed in substantially the same position as the wheel 59, may be effectively employed for cutting finger pulls in glass plates, and for polishing finger pulls. By reason of the adjustability of the shaft 58 various other, and in fact all kinds of, glass treating operations carried out with the use of grinding, cutting and polishing wheels and tools, may be accomplished. The efficacy of this machine is made out by the fact that the portable frame enables a quick and easy disposition of the cutting and glass treating operations with a single machine. This, together with the fact that the glass treating tools are mounted on a common power driven carriage that is subject to adjustment to suit the particular operations at hand or desired, make possible the advantages of the invention as hereinbefore pointed out. The machine of this invention, as a single portable unit, may efficaciously do the work heretofore required of several machines in a much more reliable manner than has heretofore been possible. Although the machine is primarily designed for use in cutting and grinding, and otherwise treating glass plates, it is obvious that it may also be applied to treatment of plates and the like of material other than glass, such for example as marble, imitation stone, and like plates and slabs.

Another advantage of the invention is the provision for economy in space, the entire machine being comparatively compact and small and capable of efficacious use in places where machines of the stationary type are not suited for use.

I claim:

1. A machine for cutting and dressing glass plates comprising a portable frame, a carriage movable on said frame, a platform depending from and yieldingly supported by said carriage, and a glass cutting tool mounted on said carriage and disposed so as to contact with the work on movement of the carriage on said frame.

2. A machine for cutting and dressing glass plates comprising a portable frame, a carriage movable on said frame, a platform depending from and yieldingly supported by said carriage, a glass cutting tool mounted on said carriage and means for vertically adjusting the carriage.

3. A machine for cutting and dressing glass plates comprising a portable frame, a track carried by said frame, a carriage slidable on said track, means for vertically adjusting said carriage, and a glass cutting tool mounted on said carriage.

4. A machine for cutting and dressing glass plates comprising a portable frame, a track carried by said frame, a carriage slidable on said track, means for vertically adjusting said carriage, and a glass cutting tool mounted on said carriage, said tool being adjustable relative to the carriage.

5. A machine for cutting and dressing glass plates comprising a portable frame, a carriage movably supported on the frame, a glass cutting tool carried by the carriage, said frame and carriage being arranged whereby the carriage may be made to straddle a support for a glass plate to be treated and the carriage disposed in position to cause the tool thereon to engage the glass plate on movement of the carriage, and means carried on the frame for moving the carriage to apply the tool to the work.

6. A machine for cutting and dressing glass plates comprising a portable frame including vertically adjustable standards, a track supported on said vertically adjustable standards, a carriage reciprocally mounted on the track and which includes a vertically adjustable platform, means for moving said carriage along the frame, and a power driven glass treating tool supported by said platform.

7. A machine for cutting and dressing glass plates comprising a portable frame, a track on the frame, a carriage reciprocally mounted on the track and including a platform depending from the carriage, and a glass treating tool carried by the platform and disposed to engage a glass plate disposed below the plane of the platform.

8. The combination with a table and a glass working machine movable relatively to the table and including a carriage on the machine, a tool support extended from the carriage to hold a tool engaged with the glass on the table as the carriage is moved thereover, of a drilling mechanism adjustably supported on the carriage in addition to said tool support to be held in drilling position over any selected portion of the glass on the table.

FREDERICK B. CARRUTHERS.